United States Patent [19]

Hunter et al.

[11] Patent Number: 5,039,316

[45] Date of Patent: Aug. 13, 1991

[54] GLOVE BAG ADAPTOR CONTROL

[75] Inventors: Robert K. Hunter, Fulton; Frederick E. Bulken, Baldwinsville, both of N.Y.

[73] Assignee: Critical-Vac Filtration Corporation, Fulton, N.Y.

[21] Appl. No.: 486,942

[22] Filed: Mar. 1, 1990

[51] Int. Cl.[5] .............................................. B01D 35/00

[52] U.S. Cl. .......................................... 55/97; 55/350; 55/385.2; 55/418; 55/431; 55/467; 98/115.4

[58] Field of Search ............... 55/97, 350, 372, 385.2, 55/418, 420, 431, 467; 98/115.4

[56] References Cited

U.S. PATENT DOCUMENTS 4,694,976 9/1987 Schuetz ................................ 55/467
4,704,951 11/1987 Pruchon ............................ 55/385.2

*Primary Examiner*—Jay H. Woo
*Assistant Examiner*—C. Scott Bushey
*Attorney, Agent, or Firm*—Wall and Roehrig

[57] ABSTRACT

An adaptor for controlling, in a fail safe manner, creation of a negative pressure in glove bags and similar types of collapsible protective environmental enclosures, has a make up air chamber having a flow control valve on the input side and a vacuum source connected to the output side, a HEPA filter positioned in an aperture in said chamber wall permits drawing of the required make-up air from ambient surroundings to the vacuum source when input from the glove bag is restricted. The HEPA filter also filters any discharge of air from the glove bag through the adaptor to ambient when the vacuum source fails.

12 Claims, 1 Drawing Sheet

GLOVE BAG ADAPTOR CONTROL

BACKGROUND OF THE INVENTION

This invention relates to negative air filtration systems, and more particularly to an adaptor and control to provide a negative air pressure in a glove bag containment unit for removal of hazardous materials.

For many years it has been customary whenever necessary to work on or remove hazardous materials from an area such as a room or building to form an enclosure around the work area and to maintain a negative air pressure in said enclosure relative to the ambient. Under these conditions, if there should be a breech in the enclosure, the hazardous material will not escape, but rather additional air will be drawn into the chamber and exhausted through conventional protective filtering mechanism. For many years small removal jobs such as small amounts of asbestos on pipes and the like have been accomplished by sealing a plastic enclosure around the area to be worked on with suitable integral gloves through which hands can be inserted to work on the hazardous materials without allowing the escape of any of the hazardous material.

Recently, it has been required by OSHA, and others interested in the best possible practice in the removal of and work on hazardous materials, that even "glove bags" used in small jobs must have a negative air pressure maintained within the enclosure to further insure against escape of any contaminated material. Since glove bags are normally made of a thin plastic transparent material, and generally enclose only a very small volume area, the provision of a negative pressure by applying a vacuum to the enclosure, very quickly collapses the air bag so that no further work can be accomplished within the bag.

Accordingly, in an effort to continue to use the economical glove bag approach while allowing sufficient time to perform the necessary operations within the glove bag, it has been proposed to draw down a glove bag to the negative pressure very slowly so as to maintain a negative pressure differential from outside to inside, but to limit the rate at which this negative pressure is built up so that 15 to 30 minutes of operating time can be obtained within the glove bag before it collapses about the work.

In most asbestos removal applications there are present on-site vacuum blowers with suitable HEPA filters to trap and retain any hazardous fibers in the exhausted air. It has been proposed to use them to also provide the negative pressure within a glove bag unit. Because of the larger size of these units and the fact that to operate efficiently they must be run at a relatively high flow volume, it has been proposed that the connection to a glove bag be greatly restricted, and that the balance of the makeup air necessary for the efficient running of the vacuum machine be drawn through the surrounding environment while only a small proportion of air is drawn from the interior of the glove bag. One device for accomplishing this has been a small metal tube adaptor for a HEPA vacuum hose which consisted of an outer tube approximately six inches long and one-and-one-half inches in diameter and an inner tube about two inches long and three-eighths of an inch in diameter that fits within the larger one and which is inserted into the glove bag to be evacuated. This smaller tube is restricted in opening so that the air drawn from the glove bag is drawn relatively slowly and the balance of the air necessary for the running of the vacuum is drawn through the larger tube surrounding the smaller tube so that the vacuum machine can still be run efficiently and yet the glove bag will not be immediately collapsed. Devices of this type have provided up to one-half hour of operating time for removal or other remediation of hazardous materials within the glove bag while insuring against unwanted escape of hazardous fibers.

These devices have proven very helpful but they have a potentially hazardous characteristic in that if the evacuation system should be stopped for any reason, after the negative air pressure is equalized by an inrush of air through the larger pipe to the smaller one, the further application of external pressure on the glove bag could force contaminated or hazardous particles within the glove bag back out in reverse fashion through the large pipe which is open to the ambient atmosphere.

OBJECTS AND SUMMARY OF THE INVENTION

Accordingly, it is an object of the present invention to overcome the limitations of the prior art devices.

It is another object of the present invention to provide an adaptor and control for maintaining a negative pressure in a glove bag in a safe and efficient fashion.

It is another object of the present invention to provide an adaptor and control for glove bag negative pressure systems in which failure of the vacuum system will not release any contaminants to the surrounding atmosphere.

It is a further object of the present invention to provide an improved, more flexible apparatus for controlling the creation of a negative pressure within a glove bag containment system.

In one form of the invention this is accomplished by providing an adaptor to be inserted in the vacuum line from the glove bag to the HEPA filtered vacuum source which includes a cylindrical HEPA filter positioned as an integral part of the in-line adaptor to allow entrance and discharge of air through the HEPA filter into and from the vacuum line. A control valve is mounted on the input side of this adaptor, for limiting the flow of air through the vacuum line.

BRIEF DESCRIPTION OF THE DRAWINGS

Further objects of the invention, together with additional feature contributing thereto and advantages accruing therefrom will be apparent from the following description of a preferred embodiment of the invention which is shown in the accompanying drawings in which.

DETAILED DESCRIPTION OF THE PREFERRED EMBODIMENT

Figure 1:
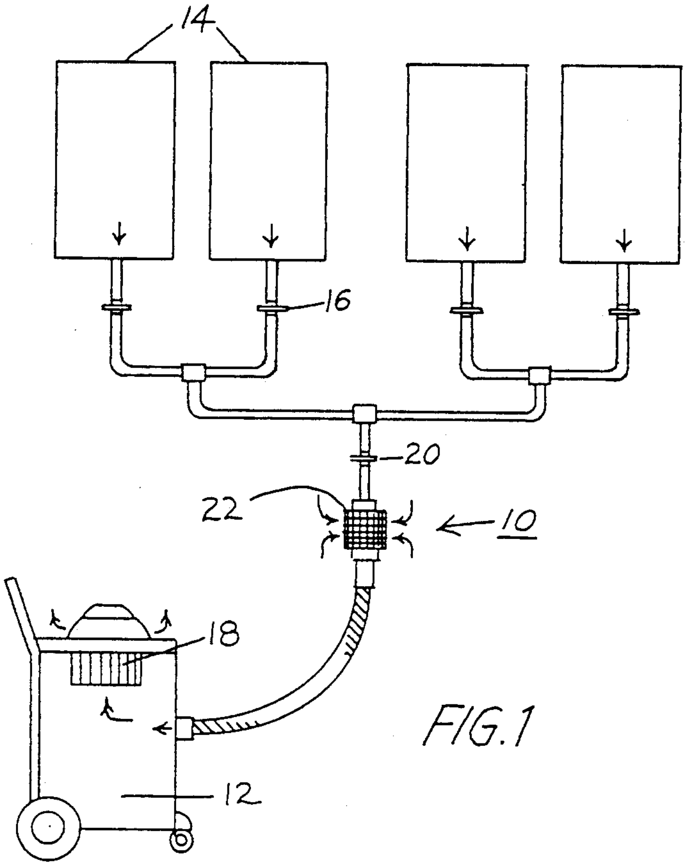
FIG. 1 is a diagrammatic view of a system embodying the present invention for the creating and controlling of negative air pressure in a plurality of glove bag enclosures.

Referring now to FIG. 1 there is shown a HEPA filtered adaptor 10 positioned in the main line to the HEPA filtered vacuum source 12 of a size sufficient to provide a negative pressure in a plurality of glove bags 14, each of which is connected through a flow control valve 16 to the HEPA filtered adaptor 10. As may be seen, the vacuum source 12 draws a vacuum on the line connected to the HEPA filtered adaptor 10 and glove bags, drawing air from within the glove bags and discharging it through the HEPA filter 18 in the exhaust from vacuum source 12 and discharging clean filtered air to the surroundings. The amount of air being drawn by the vacuum source 12 is controlled by the flow control valve 16 disposed adjacent each glove bag (when a large number of bags are being used) and/or the single valve 20 which is disposed adjacent to the HEPA filtered adaptor 10 in the input tube thereto. In addition to the air being withdrawn from the glove bags, the vacuum source 12 will draw in air from the surroundings through the HEPA filter 22 in the filtered adaptor 10 so that the vacuum source 12 can continue to run at a reasonably efficient flow volume so as to maintain the designed mode of operation. Adaptor 10 thus functions in part as a make up air chamber.

The make up air being drawn in through the filter 22 allows a smaller amount of air to be withdrawn from the individual glove bags in accordance with the settings of the flow control valves 16 and 20 so that the glove bags will not be immediately collapsed and that suitable removal operations can be carried on before the glove bag collapses around the enclosed pipe or other apparatus being worked on.

As shown in FIG. 1, four or more glove bags can be connected to a single vacuum source 12, and depending on how many are being actively utilized, the flow valves 16 may be totally turned off or adjusted for the desired rate of air withdrawal, depending on the materials being worked on, the hazardous nature of those materials, and the difficulty of the operation that is being conducted within the glove bag.

Figure 2:
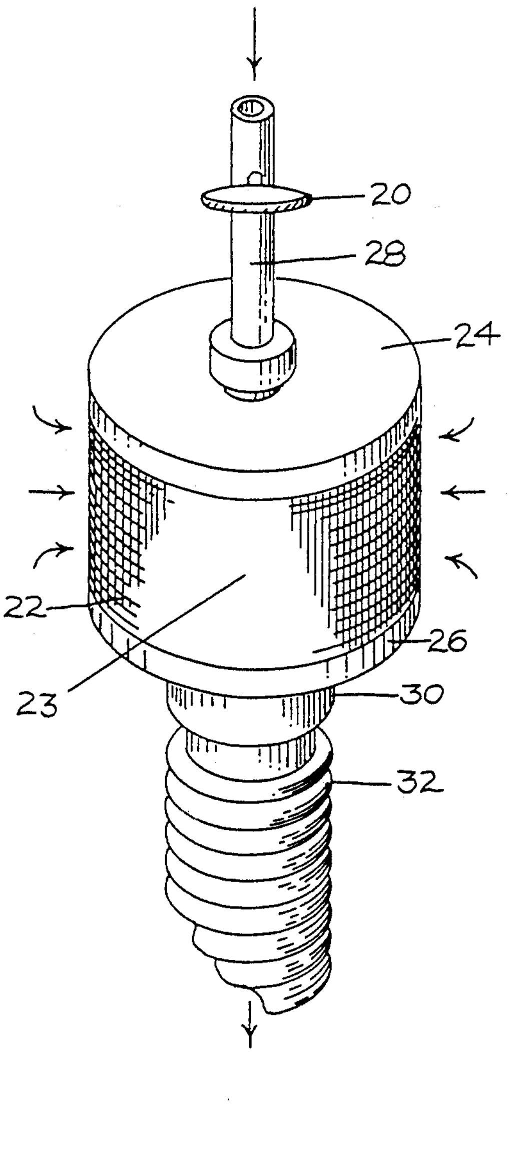
FIG. 2 is a perspective view of an adaptor in accordance with the present invention.

Referring now to FIG. 2, there is shown the HEPA filter adaptor 10 in more detail. As may be seen, it includes an inner air chamber 23 within a cylindrical HEPA filter member 22 having end plates 24 and 26. In a preferred embodiment the circumference of the cylinder is totally enclosed by HEPA filter material forming the "wall" of the cylinder. The walls of the air chamber 23 may be formed of metal, plastic or other material instead of HEPA filter material as long as an aperture is provided within which a HEPA filter can be mounted.

The flanged end plate 24 on the input side of the adaptor has removably mounted thereon an input tube 28. Tube 28 carries mounted therein a flow control valve 20 to regulate the input to the adaptor. The discharge end plate 26 of the adaptor 10 has a flanged coupling 30 arranged to suitably seal the input hose 32 from the vacuum source 12 so that a secure air tight system is provided from the glove bag to the vacuum source 12, except for air that may enter through the HEPA filter 22 in the adaptor 10.

In another embodiment the HEPA filter 22 comprises a cylindrical block of filter material that is positioned between end plates 24 and 26. In this embodiment, filter 22 becomes not only a make up air input and emergency outlet for the system, but it also serves as the primary HEPA filter for removal of the hazardous material in the glove bag air.

With either embodiment, the adaptor 10 is connected to the vacuum source 12 and to one or more glove bags 14. Flow control valves 16 and 20 are adjusted to provide the desired rate of formation of negative air pressure within the glove bag. Any excess air required by the vacuum source 12 will be pulled through the HEPA filter 22 and continue on through the discharge side of the adaptor 10 to the vacuum source. It is thus obvious that a completely protected exhaust system is provided from the glove bag to the HEPA filtered vacuum 12 so that no hazardous material can escape to the atmosphere, but will rather be filtered by the HEPA filter 18 in the vacuum source 12 discharge and HEPA filter 22.

Not only does the filter 22 filter sufficient make-up air for the efficient functioning of the vacuum source 12, but it also provides a fail-safe mechanism for preventing escape of hazardous materials from the system should the vacuum source 12 for any reason be shut down. Sometimes in removal operations power is unavoidably interrupted and the system must be fail safe under such conditions. With the device of the present invention, upon failure of power or any other stoppage of the vacuum source 12, air may enter through the filter 22 and into the glove bag 14 until pressure is equalized inside and out. Inadvertent compression of the glove bag or other forcing of air out of the glove bag will force air back through the input to the filtered adaptor 10 and then since it may not fully discharge through the vacuum 12, it may discharge through the HEPA filter 22, which will capture any contaminated material that was in the glove bag and keep it from escaping into the surrounding atmosphere. Rupture of a glove bag 14 can still release hazardous material to the ambient air upon vacuum failure.

It is thus seen that a fail-safe, completely self-contained air control system is now provided for controlled reducing of pressure in glove bags such that the failure of electrical power to the vacuum source or other catastrophic failure will not cause contamination of the surrounding atmosphere by escape of contaminated particles from the glove bag through the pressure regulating system. Also, by the provision of the filter 22 and the flow control valves 16 and/or 20, the necessary control over the draw down of the pressure within the glove bag is maintained throughout a wide variety of conditions and for a wide variation in the number of glove bags being handled by the adaptor. While we have shown four glove bags being connected to a single adaptor, this number can be varied significantly from a single glove bag to a large number of glove bags until the full capacity of the adaptor and the vacuum source 12 is reached.

It is thus apparent that an economical, practical and fail-safe adaptor/control is provided to permit control of negative air pressure within "glove bag" type enclosures used in the removal of hazardous material.

While this invention has been explained with reference to the structure disclosed herein, it is not confined to the details as set forth and this application is intended to cover any modifications and changes as may come within the scope of the following claims.

What is claimed is:

1. In a system for establishing a negative air pressure in a collapsible enclosure such as glove bags used to contain a contaminant, wherein the amount of air exhausted from the enclosure is limited, a filtered make up air control adaptor comprising;

a make up air chamber;

input means in a first wall of said chamber;

output means disposed in a second wall of said chamber;

means for limiting said input relative to said output;

filter means positioned in a third wall of said chamber to provide air flow communication from the interior of said chamber to the ambient air; and said filter means being formed of material to remove from the air flow therethrough the contaminant encountered in the enclosure.

2. A make up air control adaptor as described in claim 1 further defined by said input means having an air flow capacity less than the air flow capacity of said output means.

3. The device as described in claim 1 wherein a flow control valve is mounted in said air input means.

4. A device as described in claim 1 wherein said filter means completely fills said air chamber to additionally filter contaminated air drawn from the containment area by a vacuum source.

5. An adaptor for use with a vacuum source for exhausting a containment area which comprises:

a cylindrical filter chamber;

a cylindrical filter means disposed to form an outer cylindrical surface of said chamber to allow only filtered air to flow in and out of said chamber from and to the surrounding ambient air;

an input hose tube in one end of said chamber connected to a hose connected to a containment area;

an output hose coupling in the other end of said chamber connected to a hose connected to a vacuum source;

means for restricting said input hose tube;

whereby when said device is connected between a vacuum source and a negative pressure containment area the flow of air being exhausted from said containment area is restricted and any needed make up air drawn in through said filter and upon failure of the vacuum source, contaminated air released from said containment area will be exhausted through said filter.

6. A device as described in claim 5 wherein said filter means comprises a filter material sized to remove fibrous and particulate material.

7. A device as described in claim 5 wherein said means for restricting said input is further defined by said input means having an air flow capacity less than the air flow capacity of said output means.

8. A device as described in claim 5 wherein said means for restricting said input includes an air flow control valve mounted in said input hose tube.

9. A device as described in claim 5 wherein said input hose is connected to a plurality of containment areas and an air control valve is disposed in each containment area input hose.

10. Apparatus for establishing a controlled negative air pressure in an enclosure relative to its surroundings comprising:

a filtered source of vacuum;

means connecting said source of vacuum to the enclosure to be controlled;

air flow control means disposed in said connecting means to regulate the flow of air from the enclosure to said vacuum source;

a filtered adaptor means positioned in said connecting means in operative association with said air flow control means and said vacuum source; said adaptor means having a filter means positioned to filter air flow to and from the interior of said connecting means and the ambient atmosphere;

so that the degree of negative air pressure in the enclosure may be regulated by limiting air flow from the enclosure through said control means to less than the capacity of the vacuum source while allowing necessary make up air to enter through said filter means.

11. In a system for establishing a controlled negative pressure in a collapsible enclosure such as glove bags used to contain a contaminant relative to the surrounding ambient air, the method of controlling the negative pressure to provide a suitable time of operation within the collapsible enclosure which comprises the steps of:

connecting the collapsible enclosure to a source of vacuum;

limiting the amount of air that can be withdrawn from the collapsible enclosure to a selected level less than the capacity of the source of vacuum;

providing filter means for introducing make up air for the source of vacuum from the ambient air surroundings of the enclosure;

filtering, the make up air introduced from the ambient air to the source of vacuum, and filtering air flowing out of the negative pressure enclosure through said means for filtering make up air.

12. The method of claim 11 further defined by selecting the filter means to remove the contaminant in said collapsible enclosure from the air flowing out of said enclosure.

* * * * *